United States Patent
Jia et al.

(10) Patent No.: US 10,440,612 B2
(45) Date of Patent: Oct. 8, 2019

(54) METHOD AND APPARATUS FOR CONTROLLING TRAFFIC STEERING AND COMMUNICATIONS SYSTEM

(71) Applicant: FUJITSU LIMITED, Kawasaki-shi, Kanagawa (JP)

(72) Inventors: Meiyi Jia, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/676,282

(22) Filed: Aug. 14, 2017

(65) Prior Publication Data

US 2017/0367010 A1 Dec. 21, 2017

Related U.S. Application Data

(63) Continuation of application No. PCT/CN2015/073194, filed on Feb. 16, 2015.

(51) Int. Cl.
*H04W 28/08* (2009.01)
*H04W 84/12* (2009.01)
(Continued)

(52) U.S. Cl.
CPC ........... *H04W 28/08* (2013.01); *H04W 36/22* (2013.01); *H04W 88/06* (2013.01); *H04W 84/12* (2013.01)

(58) Field of Classification Search
CPC ..... H04W 36/14; H04W 36/22; H04W 76/18; H04W 28/08; H04W 36/0022;
(Continued)

(56) References Cited

U.S. PATENT DOCUMENTS

2010/0003980 A1* 1/2010 Rune ............... H04W 48/16
455/436
2013/0265879 A1 10/2013 Qiang
(Continued)

FOREIGN PATENT DOCUMENTS

CN 103763738 A 4/2014
CN 104333871 A 2/2015
(Continued)

OTHER PUBLICATIONS

3GPP TR 37.834 v2.0.0, "3rd Generation Partnership Project; Technical Specification Group Radio Access Network; Study on WLAN/3GPP radio interworking (Release 12)", Nov. 2013.
(Continued)

*Primary Examiner* — Awet Haile
(74) *Attorney, Agent, or Firm* — Myers Wolin, LLC

(57) ABSTRACT

This application provides a method and apparatus for controlling traffic steering and a communications system. In an implementation of the method for controlling traffic steering, the method is applicable to an RAN node and comprises: traffic steering indication information is determined; and the traffic steering indication information is transmitted to UE, so that the UE steers corresponding traffic to a traffic steering target according to the traffic steering indication information. With the method, load balance between 3GPP RAN and WLAN at an RAN level may be ensured, and in comparison with an existing mechanism, user experiences and system performance are improved.

12 Claims, 8 Drawing Sheets

(51) Int. Cl.
*H04W 88/06* (2009.01)
*H04W 36/22* (2009.01)

(58) Field of Classification Search
CPC ............ H04W 36/0027; H04W 88/06; H04W 36/0016; H04W 36/0066; H04W 36/0083; H04W 36/26; H04W 48/04; H04W 48/14; H04W 84/12; H04W 88/10; H04W 28/0215; H04W 60/04; H04W 76/16; Y02D 70/142
See application file for complete search history.

(56) References Cited

U.S. PATENT DOCUMENTS

| | | | |
|---|---|---|---|
| 2014/0064068 A1 | 3/2014 | Horn et al. | |
| 2015/0003253 A1 | 1/2015 | Wolfner et al. | |
| 2015/0023165 A1 | 1/2015 | Ye | |
| 2016/0127967 A1 | 5/2016 | Liu et al. | |
| 2016/0242235 A1* | 8/2016 | Vasudevan | H04W 88/06 |
| 2016/0249253 A1* | 8/2016 | Redana | H04W 28/08 |
| 2016/0277956 A1* | 9/2016 | Lindheimer | H04W 36/22 |

FOREIGN PATENT DOCUMENTS

| | | |
|---|---|---|
| WO | 2013/150500 A2 | 10/2013 |
| WO | 2014/035619 A1 | 3/2014 |
| WO | 2014/110777 A1 | 7/2014 |
| WO | 2014/179509 A2 | 11/2014 |
| WO | 2014/182210 A1 | 11/2014 |
| WO | 2014/205713 A | 12/2014 |
| WO | 2014/207253 A1 | 12/2014 |

OTHER PUBLICATIONS

Nsn et al: "(Compromising) WLAN IW Solution for UEs with and without ANDSF", Agenda Item: 51, 3GPP TSG-RAN WG2 Meeting #83, R2-132327, Barcelona, Spain, Aug. 19-23, 2013.
Extended European search report with supplementary European search report and the European search opinion issued by the European Patent Office for corresponding European Patent Application No. 15882317.9, dated Jun. 4, 2018.
International Search Report issued for corresponding International Patent Application No. PCT/CN2015/073194, dated Nov. 13, 2015, with an English translation.
Written Opinion of the International Searching Authority issued for corresponding International Patent Application No. PCT/CN2015/073194, dated Nov. 13, 2015, with an English translation.
Notification of Reasons for Refusal issued by the Japan Patent Office for corresponding Japanese Patent Application No. 2017-541804, dated Jul. 31, 2018, with an English translation.
Notice of Preliminary Rejection issued by the Korean Intellectual Property Office for corresponding Korean Patent application No. 10-2017-7023874, dated Mar. 4, 2019 with an English translation.
Catt, "Traffic steering of solutions without ANDSF," Agenda item: 5.1, 3GPP TSG RAN WG2 Meeting #84, U-133892, San Francisco, USA, Nov. 11-15, 2013.
LG Electronics Inc. "Legacy and enhanced ANDSF," Agenda item: 5.1, 3GPP TSG-RAN2 Meeting #85, R2-140774, Prague, Czech Republic, Feb. 10-14, 2014.
Communication pursuant to Article 94(3) EPC issued by the European Patent Office for corresponding European Patent Application No. 15 882 317.9-1214, dated Mar. 21, 2019.

* cited by examiner

METHOD AND APPARATUS FOR CONTROLLING TRAFFIC STEERING AND COMMUNICATIONS SYSTEM

CROSS REFERENCE TO RELATED APPLICATIONS

This application is a continuation application of International Application PCT/CN2015/073194 filed on Feb. 16, 2015, the entire contents of which are incorporated herein by reference.

FIELD

This disclosure relates to the field of communications, and in particular to a method and apparatus for controlling traffic steering and a communications system during interoperation between a 3GPP (3rd generation partnership project) RAN (radio access network) and a WLAN (wireless local area network).

BACKGROUND

In the current 3GPP RAN technology, a network for radio access includes UTRAN (UMTS Terrestrial Radio Access Network, UMTS (Universal Mobile Telecommunications System) and E-UTRAN (evolved UTRAN). WLAN is another wireless access network that is widely deployed by operators in many countries in the world. It is applicable to a radio access system, an intelligent traffic wireless communications system, and a peer-to-peer or peer-to-multipeer communications system, etc. These networks may be used by anyone using any equipment satisfying relevant requirements without authorization. As increasing abundance of wireless traffic, wireless data traffic sharply increases, and the load of the existing 3GPP RAN is more and more heavy. Interoperation between the 3GPP RAN and WLAN is a method for overcoming the load increase.

The interoperation between the 3GPP RAN and WLAN is to achieve steering of UE (user equipment, which is also referred to as a user terminal, a user, or a terminal) or offloadable traffic in the UE between different radio access networks under assistance or control by RAN nodes. In particular, the RAN nodes provide auxiliary information or indication to the UE, and the UE selects an accessible wireless network or steers steerable traffic to a corresponding radio access network according to the information or indication. However, it must be noted that as WLAN is based on a contention mechanism and is flexible in deployment, it is possible that a problem of interference or relatively long contention time occurs, and quality of the radio traffic cannot be guaranteed.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

During interoperation between the 3GPP RAN and WLAN, in determining a radio access network which traffic is steered to, if an existing determination method is followed and there is no control of traffic steering at RAN level, traffic of an inappropriate number shall be steered, which possibly occurs in a large amount terminals at the same time. Thus, transmission of traffic can only be finished after a long period of time, even transmission fails at last or the traffic is steered to and fro between different radio access networks. Hence, how to guarantee negotiation on traffic steering between a terminal and a base station becomes a problem needing to be solved.

In order to solve the above problem, embodiments of this disclosure provide a method and apparatus for controlling traffic steering and a communications system.

According to a first aspect of the embodiments of this disclosure, there is provided a method for controlling traffic steering, applicable to an RAN node, the method including:

traffic steering indication information is determined; and the traffic steering indication information is transmitted to UE, so that the UE steers corresponding traffic to a traffic steering target according to the traffic steering indication information.

According to a second aspect of the embodiments of this disclosure, there is provided a method for controlling traffic steering, applicable to UE, the method including:

traffic steering indication information transmitted by an RAN node is received; and corresponding traffic is steered to a traffic steering target according to the traffic steering indication information.

According to a third aspect of the embodiments of this disclosure, there is provided a method for controlling traffic steering, applicable to UE, the method including:

traffic steering indication information is determined; and the traffic steering indication information is transmitted to an RAN node, so that the RAN node decides a traffic steering ratio.

According to a fourth aspect of the embodiments of this disclosure, there is provided a method for controlling traffic steering, applicable to an RAN node, the method including:

traffic steering indication information transmitted by UE is received;

a traffic steering ratio is determined according to the traffic steering indication information; and the traffic steering ratio is transmitted to the UE, so that the UE steers corresponding traffic to a traffic steering target according to the traffic steering ratio.

According to a fifth aspect of the embodiments of this disclosure, there is provided an apparatus for controlling traffic steering, applicable to an RAN node, the apparatus including:

a determining unit configured to determine traffic steering indication information; and a transmitting unit configured to transmit the traffic steering indication information to UE, so that the UE steers corresponding traffic to a traffic steering target according to the traffic steering indication information.

According to a sixth aspect of the embodiments of this disclosure, there is provided an apparatus for controlling traffic steering, applicable to UE, the apparatus including:

a receiving unit configured to receive traffic steering indication information transmitted by an RAN node; and a processing unit configured to steer corresponding traffic to a traffic steering target according to the traffic steering indication information.

According to a seventh aspect of the embodiments of this disclosure, there is provided an apparatus for controlling traffic steering, applicable to UE, the apparatus including:

a determining unit configured to determine traffic steering indication information; and a transmitting unit configured to transmit the traffic steering indication information to an RAN node, so that the RAN node decides a traffic steering ratio.

According to an eighth aspect of the embodiments of this disclosure, there is provided an apparatus for controlling traffic steering, applicable to an RAN node, the apparatus including:

a receiving unit configured to receive traffic steering indication information transmitted by UE;

a first determining unit configured to determine a traffic steering ratio according to the traffic steering indication information; and a transmitting unit configured to transmit the traffic steering ratio to the UE, so that the UE steers corresponding traffic to a traffic steering target according to the traffic steering ratio.

According to a ninth aspect of the embodiments of this disclosure, there is provided UE, including the apparatus for controlling traffic steering as described in the sixth or seventh aspect.

According to a tenth aspect of the embodiments of this disclosure, there is provided an RAN node, including the apparatus for controlling traffic steering as described in the fifth or eighth aspect.

According to an eleventh aspect of the embodiments of this disclosure, there is provided a communications system, including the UE as described in the ninth aspect and the RAN node as described in the tenth aspect.

According to another aspect of the embodiments of this disclosure, there is provided a computer readable program code, which, when executed in an apparatus for controlling traffic steering or UE, will cause a computer unit to carry out the method for controlling traffic steering as described in the second or third aspect in the apparatus for controlling traffic steering or the UE.

According to a further aspect of the embodiments of this disclosure, there is provided a computer readable medium, including a computer readable program code, which will cause a computer unit to carry out the method for controlling traffic steering as described in the second or third aspect in an apparatus for controlling traffic steering or UE.

According to still another aspect of the embodiments of this disclosure, there is provided a computer readable program code, which, when executed in an apparatus for controlling traffic steering or an RAN node, will cause a computer unit to carry out the method for controlling traffic steering as described in the first or fourth aspect in the apparatus for controlling traffic steering or the RAN node.

According to yet another aspect of the embodiments of this disclosure, there is provided a computer readable medium, including a computer readable program code, which will cause a computer unit to carry out the method for controlling traffic steering as described in the first or fourth aspect in an apparatus for controlling traffic steering or an RAN node.

An advantage of the embodiments of this disclosure exists in that with the embodiments of this disclosure, load balance between 3GPP RAN and WLAN at RAN level may be ensured, and in comparison with an existing mechanism, user experiences and system performance are improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of this disclosure shall be described below with reference to the accompanying drawings. These embodiments are illustrative only, and are not intended to limit this disclosure.

During interoperation between the 3GPP RAN and WLAN, in order to achieve access network selection and traffic steering, three methods at the RAN side are discussed currently. The first one is that if UE has an ANDSF (access network discovery and selection function), an access network which traffic is steered to and traffic which is to be steered are determined using rules specified therein. The second one is that if the UE has no ANDSF, the UE, based on measurement thresholds provided by the RAN side and rules specified in a protocol, determines an access network which all steerable traffic is steered to. And the third one is that the RAN side requires the UE to measure some measurement quantities of some access networks, and defines triggering conditions for report of measurement results; based on a measurement result reported by the UE, a current status of the base station and information possibly collected from a WLAN AP (access point), determines an access network which traffic is steered to and traffic to be steered by the UE, and transmits a command to indicate the UE to complete the traffic steering.

Figure 1:
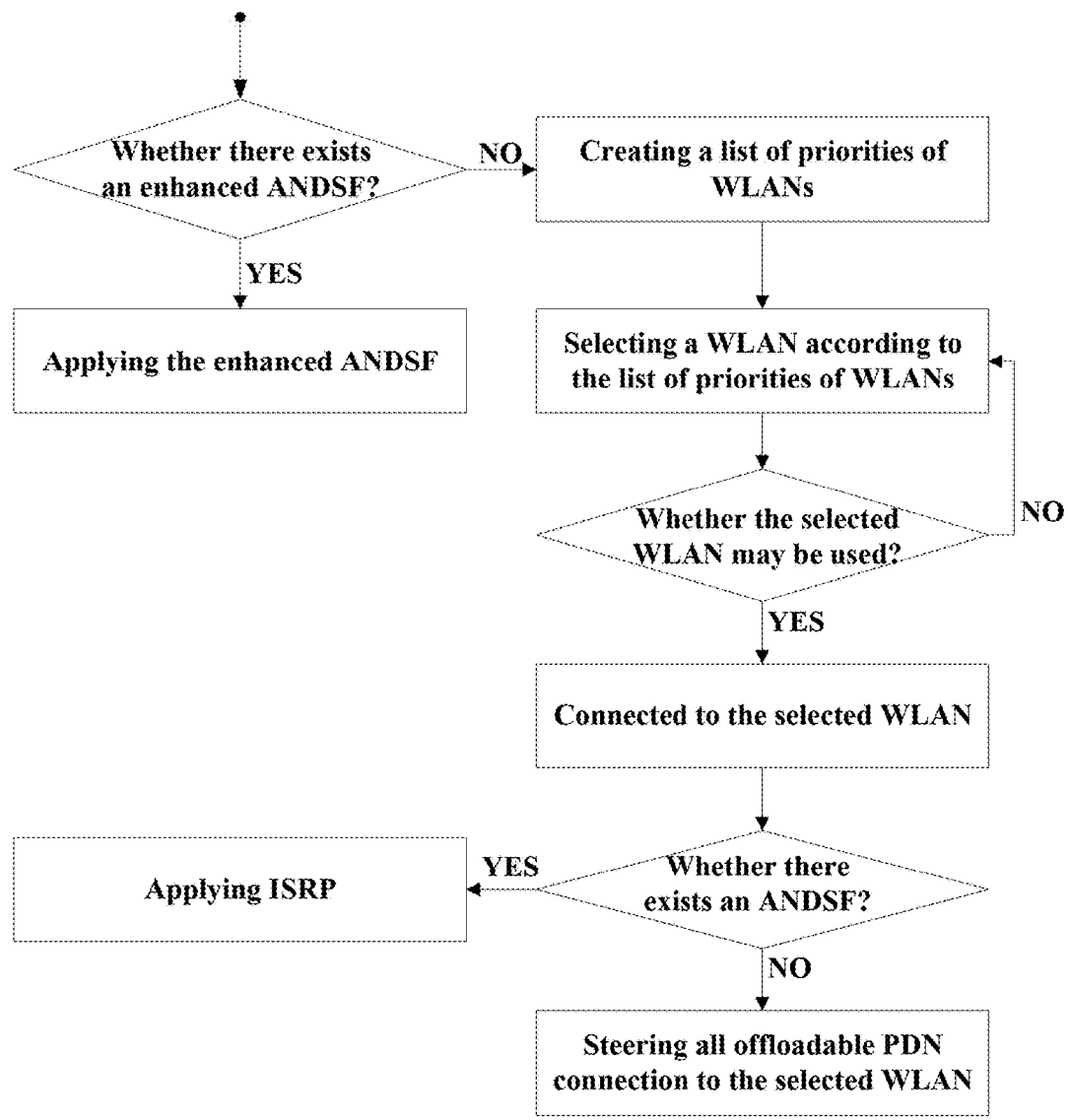
FIG. 1 is a flowchart of processing at a UE side of an implementation of achievement of access network selection and traffic steering.
Figure 2:
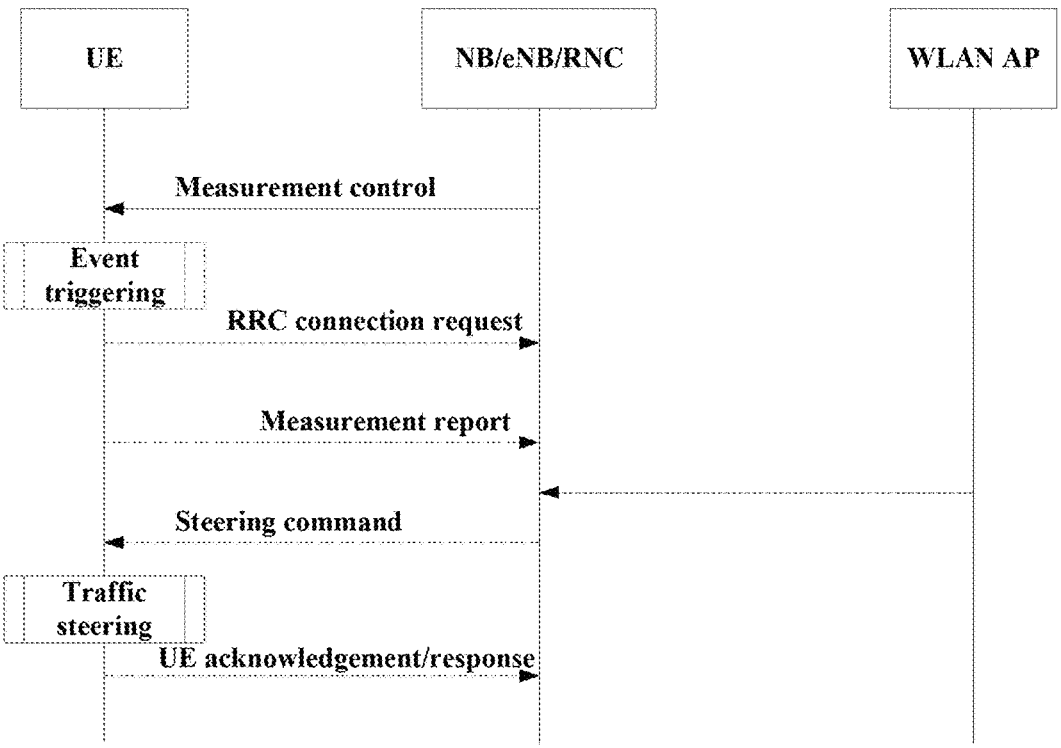
FIG. 2 is a flowchart of information exchange of another implementation of achievement of access network selection and traffic steering.

FIG. 1 is a flowchart of processing by the UE in the first and second methods, and FIG. 2 is a flowchart of information exchange in the third method. It is assumed that AP1 and AP2 are both available WLANs. If UE1 steers traffic from the base station to AP1 based on the above process, it will steer a part of or all steerable PDN (packet data network) connection to AP1. Supposing that a load of the base station at this moment is 70% and a load of AP1 is 60%, there are a large amount of UEs in an overlapped coverage of the base station and AP1. In a case where there exists no ANDSF, UE1 decides to steer all the steerable PDN connection to AP1, in the same circumstance, a large amount of UEs may make the same decision, which will result in overload of AP1. In a case of overload of AP1, almost all UEs connected to AP1 may possibly need to wait for a longer time to obtain available resources for transmitting traffic via contention, which results in degradation of user experiences. What is worse is that the UEs will initiate traffic steering to the base station, which results in that the traffic is steered to and fro between the base station and AP1.

In order to solve the above problem, this application is proposed, which shall be described below with reference to the accompanying drawings.

During interoperation between the 3GPP RAN and WLAN, traffic may be steered from the 3GPP RAN to WLAN, or from WLAN to the 3GPP RAN. In order to ensure punctuality and accuracy of the traffic steering from WLAN to the 3GPP RAN, it is assumed in this application that connection between UE and the 3GPP RAN is always kept, no matter whether there exists traffic that is transmitted in the 3GPP RAN. For the convenience of description, the case where traffic is steered from the 3GPP RAN to WLAN is only described in this application, and a mechanism of which is also applicable to the case where traffic is steered from WLAN to the 3GPP RAN, and will not be described herein any further.

Embodiment 1

Figure 3:
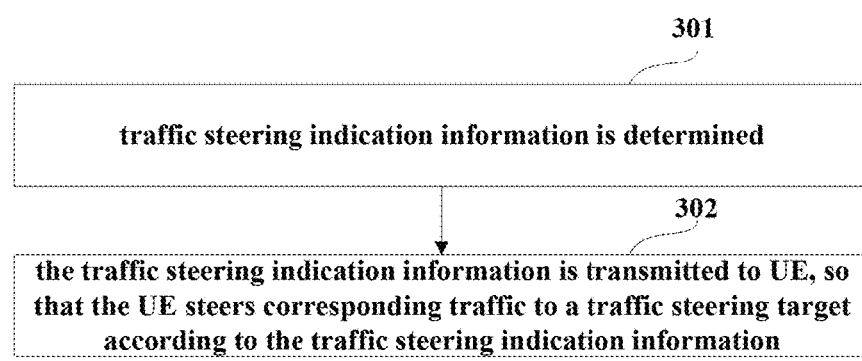
FIG. 3 is a flowchart of a method for controlling traffic steering of Embodiment 1.

This embodiment provides a method for controlling traffic steering, applicable to a RAN node, such as a NodeB (a base station in 3G), an eNodeB (a base station in LTE), and an RAC (radio network controller), etc. FIG. 3 is a flowchart of the method. Referring to FIG. 3, the method includes:

step 301: traffic steering indication information is determined; and step 302: the traffic steering indication information is transmitted to UE, so that the UE steers corresponding traffic to a traffic steering target according to the traffic steering indication information.

In this embodiment, the traffic steering indication information may be a traffic steering ratio, or a traffic steering ratio and a shift range, or a traffic steering target and a traffic steering ratio, or a traffic steering target, a traffic steering ratio and a shift range, or a traffic steering target, traffic steering and offloadable APNs and/or bearer IDs. Traffic steering indication information determined according to different implementation scenarios is different.

In a scenario, a decision of traffic steering is made by a terminal with assistance of a network side.

In this scenario, as the network selection and traffic steering are determined by the UE, a suggested traffic steering ratio is indicated by the network side (the RAN node) to the UE.

In this scenario, once the UE enters into a connected mode, the RAN node may determine the traffic steering ratio based on knowledge of itself, such as a load of the RAN node, a load of a neighboring node, information collected from the UE, and information collected from a WLAN AP when the AP is co-located with the RAN node, etc. The traffic steering ratio may be directed to steering from the 3GPP RAN to the WLAN AP, or may be directed to steering from the WLAN AP to the 3GPP RAN.

In this scenario, the information collected from the UE may include, for example, traffic being performed by the UE, and the UE capability, etc. The UE capability may include, for example, whether supporting UE determined network selection and traffic steering assisted by the RAN, and whether supporting an enhanced ANDSF, etc. In a case where the AP is co-located with the RAN node, the RAN node may collect information related to the WLAN from the AP via an internal interface. The information collected from the AP may include, for example, a load of WLAN, etc.

In this scenario, if the UE does not support the ANDSF, and supports only the UE determined network selection and traffic steering assisted by the RAN, the RAN node may transmit the traffic steering ratio to the UE. The UE will steer corresponding traffic to a traffic steering target, such as a WLAN or an RAN node, according to the ratio indicated by the RAN node.

In this scenario, if the UE supports the ANDSF and the RAN node is able to obtain ANDSF information related to the UE from an operator, the RAN node may further determine the traffic steering ratio with reference to an ISRP (inter-system routing policy, which is a policy used by a core network for determining traffic steering) and transmit the traffic steering ratio to the UE. And the UE will steer corresponding traffic to a traffic steering target according to the received ratio.

In this scenario, if the UE supports the ANDSF, but the RAN node is unable to obtain ANDSF information related to the UE from an operator, the RAN node may determine the traffic steering ratio and a permitted shift range at the same time, and transmit them to the UE. And the UE will steer corresponding traffic to a traffic steering target according to the received traffic steering ratio and permitted shift range.

In this scenario, the traffic steering ratio may be a percentage, i.e. 0~100%, and is denoted by an integer, such as being denoted by at least 7 bits. It may be taken as a new information element and included in a dedicated RRC message, such as an RRC reconfiguration message, or may be together with a threshold value or an OPI, or may be transmitted separately.

In this scenario, the permitted shift range may also be a percentage, such as −5%~5%, and may be taken as a new information element and included in a dedicated RRC message, such as an RRC reconfiguration message, or may be together with a threshold value or an OPI, or may be transmitted separately. The permitted shift range is introduced for reducing shift of traffic steering, and is only configured when the UE supports the ANDSF, but the RAN node is unable to obtain related information.

In another scenario, the decision of traffic steering is made by the network side and is performed by a terminal under control of the network side.

In this scenario, as the network selection and traffic steering are determined by the network side, the network side (the RAN node), in addition to indicating the suggested traffic steering ratio to the UE, indicates a traffic steering target to the UE, such as steering to which WLAN or which RAN node.

In this scenario, similar to the above scenario, once the UE enters into a connected mode, the RAN node may determine the traffic steering target and the traffic steering ratio based on knowledge of itself, such as a load of the RAN node, a load of a neighboring node, information collected from the UE, a measurement report, and information collected from an AP when the AP is co-located with the RAN node, etc.

In this scenario, the information collected from the UE may include, for example, traffic being performed by the UE, and the UE capability, etc. The UE capability may include, for example, whether supporting UE determined network selection and traffic steering assisted by the RAN, and whether supporting an enhanced ANDSF, etc. In this scenario, in a case where the AP is co-located with the RAN node, the RAN node may collect information related to the WLAN from the AP via an internal interface. The information collected from the AP may include, for example, a load of WLAN, etc. In this scenario, if the RAN node configures measurement for the UE, the RAN node may further collect information related to the WLAN from a measurement report transmitted by the UE via measurement of the UE, so as to decide the traffic steering target.

In this scenario, if the UE does not support the ANDSF, the RAN node may acquire APNs (access point names) and/or bearer information from a core network, so as to determine which APNs and/or which bearers may be offloaded, and then transmit IDs of the offloadable APNs and/or bearer, together with the previously determined traffic steering target and traffic steering ratio, to the UE. And the UE may perform traffic steering according to these information.

In this scenario, similar to the above scenario, if the UE supports the ANDSF and the RAN node is able to obtain ANDSF information related to the UE from an operator, the RAN node may further determine the traffic steering ratio with reference to an ISRP indicated by the ANDSF, and transmit the traffic steering ratio, together with the traffic steering target, to the UE. And the UE will steer corresponding traffic to the traffic steering target according to the received ratio.

In this scenario, similar to the above scenario, if the UE supports the ANDSF, but the RAN node is unable to obtain ANDSF information related to the UE from an operator, the RAN node may determine the traffic steering ratio and a permitted shift range at the same time, and transmit the traffic steering ratio, the shift range and the traffic steering target to the UE. And the UE will steer corresponding traffic to the traffic steering target according to the received traffic steering ratio and permitted shift range.

In this scenario, the traffic steering ratio and permitted shift range are identical to those in the above scenario, and will not be described herein any further.

With the method of this embodiment, the RAN node indicates a suggested traffic steering ratio to the UE, load balance between 3GPP RAN and WLAN at RAN level may be ensured, and in comparison with an existing mechanism, user experiences and system performance are improved.

Embodiment 2

Figure 4:
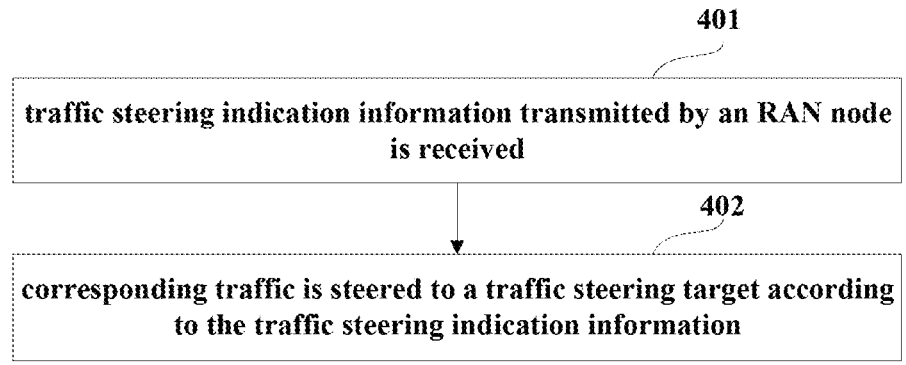
FIG. 4 is a flowchart of a method for controlling traffic steering of Embodiment 2.

This embodiment provides a method for controlling traffic steering, applicable to UE. This method is processing at a UE side corresponding to the method of Embodiment 1, with contents identical to those in Embodiment 1 being not going to be described herein any further. FIG. 4 is a flowchart of the method. Referring to FIG. 4, the method includes:

step 401: traffic steering indication information transmitted by an RAN node is received; and step 402: corresponding traffic is steered to a traffic steering target according to the traffic steering indication information.

In this embodiment, corresponding to a former scenario in Embodiment 1, the traffic steering indication information may be a traffic steering ratio, or a traffic steering ratio and a permitted shift range. And in this embodiment, the UE may determine a traffic steering target first after receiving the traffic steering indication information, and then steer corresponding traffic to the traffic steering target according to the traffic steering ratio or the traffic steering ratio and the permitted shift range. In this embodiment, the determination of the traffic steering target may be performed in an existing manner, which will not be described herein any further.

In this embodiment, corresponding to a latter scenario in Embodiment 1, the traffic steering indication information may be a traffic steering target and a traffic steering ratio, or a traffic steering target, a traffic steering ratio and a permitted shift range, or may be a traffic steering target, a traffic steering ratio and offloadable APNs and/or bearer IDs. And in this embodiment, the UE may steer corresponding traffic to the traffic steering target according to the traffic steering ratio, or the traffic steering ratio and the permitted shift range, or the traffic steering ratio and the offloadable APNs and/or bearer IDs.

With the method of this embodiment, the RAN node indicates a suggested traffic steering ratio to the UE, load balance between 3GPP RAN and WLAN at RAN level may be ensured, and in comparison with an existing mechanism, user experiences and system performance are improved.

Embodiment 3

Figure 5:
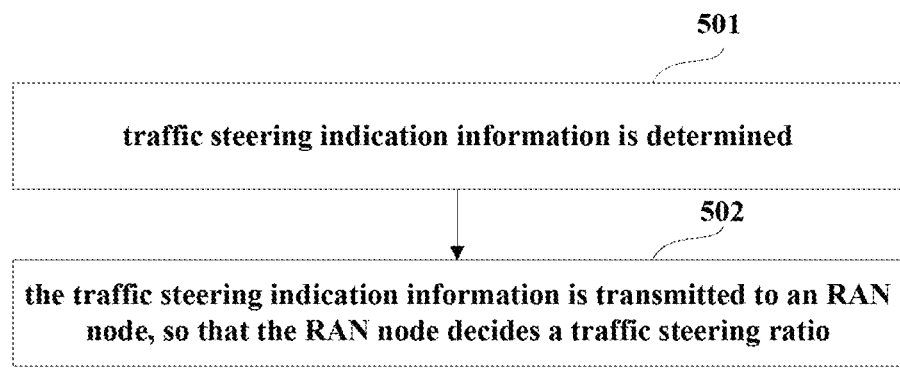
FIG. 5 is a flowchart of a method for controlling traffic steering of Embodiment 3.

This embodiment provides a method for controlling traffic steering, applicable to UE. FIG. 5 is a flowchart of the method. Referring to FIG. 5, the method includes:

step 501: traffic steering indication information is determined; and step 502: the traffic steering indication information is transmitted to an RAN node, so that the RAN node decides a traffic steering ratio.

In this embodiment, the traffic steering indication information may be a traffic steering target and a suggested traffic steering ratio, or only a suggested traffic steering ratio, or a suggested traffic steering ratio for measurement objects. And the traffic steering indication information determined according to different implementation scenarios is different.

In a scenario, a decision of traffic steering is made by a terminal with assistance of a network side.

In this scenario, as the network selection and traffic steering are determined by the UE, a traffic steering target and a suggested traffic steering ratio may be indicated by the UE to the network side (the RAN node).

In this scenario, if the UE has no ANDSF, i.e. the UE does not support the ANDSF, in an idle state, the UE may first perform a network selection process according to RAN assistant information, rules specified in a protocol and UE implementation, and determine a network to be accessed. Then, before entering into a connected state, i.e. during a random access procedure, the UE may indicate the RAN node of a traffic steering target and a suggested traffic steering ratio determined based on estimation by the UE itself. After receiving the indication, the RAN node may update the RAN assistant information and the traffic steering ratio based on knowledge of itself, and feed back updated traffic steering information to the UE. The updated traffic steering information contains the traffic steering ratio, and, alternatively, updated RAN assistant information. And the UE may adjust the traffic steering of itself according to the indication of the RAN node.

In this scenario, if the UE has an ANDSF, i.e. the UE supports the ANDSF, in an idle state, the UE may first perform a network selection process according to RAN assistant information, rules specified in a protocol, the ANDSF, especially an ISRP therein, and the UE implementation, and determine a network to be accessed. Then, before entering a connected state, i.e. during a random access procedure, the UE may indicate the RAN node of a traffic steering target and a suggested traffic steering ratio determined based on estimation by the UE itself. After receiving the indication, the RAN node may update the RAN assistant information and the traffic steering ratio based on knowledge of itself, and feed back the updated traffic steering information to the UE, the updated traffic steering information containing the traffic steering ratio, and, alternatively, updated RAN assistant information. And the UE may adjust the traffic steering of itself according to the indication of the RAN node.

In another scenario, the decision of traffic steering is made by the network side and is performed by a terminal under control of the network side.

In this scenario, if the UE does not support the ANDSF, the UE indicates a suggested traffic steering ratio to the network side (the RAN node), and the RAN node may determine a traffic steering target and a final traffic steering ratio according to knowledge of itself and the received suggested traffic steering ratio indicated by the UE, and provide them to the UE. In this scenario, similar to the latter scenario in Embodiment 1, the RAN node may take offloadable APNs and/or bearer IDs, together with the traffic steering target and the final traffic steering ratio, as the updated traffic steering information, to transmit to the UE.

In this scenario, if the UE supports the ANDSF, the UE may determine steerable traffic ratios for measurement objects configured by the network side (the RAN node) according to an ISRP indicated by the ANDSF, and indicate the steerable traffic ratios to the RAN node.

In this scenario, the UE may indicate the traffic steering ratios for measurement objects via a measurement report fed back to the RAN node, and may indicate the traffic steering ratios for measurement objects by separate list.

If the UE indicates the traffic steering ratios for measurement objects via a measurement report, the measurement report transmitted by the UE to the RAN node may include the measurement objects configured for the UE by the RAN node, measurement result obtained by the UE after measuring the measurement objects and the steerable traffic ratios for the measurement objects determined by the UE according to the ISRP.

If the UE indicates the traffic steering ratios for measurement objects by separate list, the list may include multiple items, each item at least including two contents, one is the measurement objects configured for the UE by the RAN node, and the other is the steerable traffic ratios for the measurement objects determined by the UE according to the ISRP. Furthermore, the UE may determine priorities of the multiple items based on UE implementation, and arrange the items in a descending order of the priorities, or arrange the items in a descending order of the steerable traffic ratios.

When the RAN node receives the measurement report or the list indicated by the UE, the RAN node may determine a traffic steering target and a corresponding traffic steering ratio within a range based on knowledge of itself and implementation, and take the traffic steering ratio and the traffic steering target as the updated traffic steering information to transmit to the UE.

In this embodiment, if the UE receives the updated traffic steering information fed back by the RAN node, the UE may adjust its traffic steering ratio according to the updated traffic steering information, and steer corresponding traffic to the traffic steering target according to the traffic steering ratio.

In this embodiment, if the updated traffic steering information does not contain the traffic steering target and contains only the traffic steering ratio, corresponding to the former scenario of this embodiment, the traffic steering target is determined by the UE, and the UE may steer corresponding traffic to the traffic steering target according to the traffic steering ratio.

In this embodiment, if the updated traffic steering information contains the traffic steering target, and furthermore, contains the traffic steering ratio or the traffic steering ratio and the offloadable APNs and/or bearer IDs, corresponding to the latter scenario of this embodiment, the traffic steering target is determined by the RAN node and indicated by the RAN node to the UE, and the UE may steer corresponding traffic to the traffic steering target according to the traffic steering ratio or the traffic steering ratio and the offloadable APNs and/or bearer IDs.

With the method of this embodiment, the UE indicates a suggested traffic steering ratio to the RAN node, load balance between 3GPP RAN and WLAN at RAN level may be ensured, and in comparison with an existing mechanism, user experiences and system performance are improved.

Embodiment 4

Figure 6:
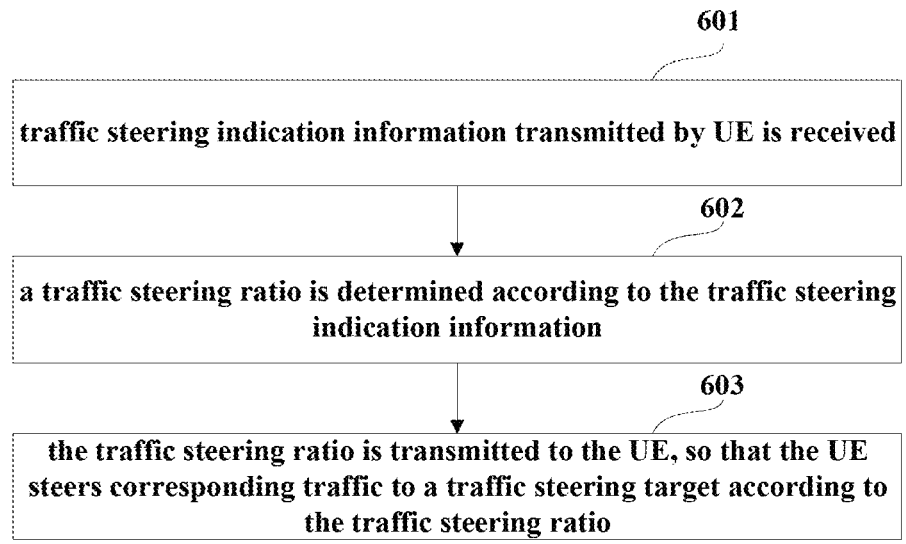
FIG. 6 is a flowchart of a method for controlling traffic steering of Embodiment 4.

This embodiment provides a method for controlling traffic steering, which is applicable to an RAN node, such as a NodeB (a base station in 3G), an eNodeB (a base station in LTE), and an RAC (radio network controller), etc. This method is processing at a network side corresponding to the method of Embodiment 3, with contents identical to those in Embodiment 3 being not going to be described herein any further. FIG. 6 is a flowchart of the method. Referring to FIG. 6, the method includes:

step 601: traffic steering indication information transmitted by UE is received;

step 602: a traffic steering ratio is determined according to the traffic steering indication information; and step 603: the traffic steering ratio is transmitted to the UE, so that the UE steers corresponding traffic to a traffic steering target according to the traffic steering ratio.

In this embodiment, corresponding to Embodiment 3, the traffic steering indication information includes: a traffic steering target and a suggested traffic steering ratio, or a suggested traffic steering ratio, or a suggested traffic steering ratio for measurement objects.

In this embodiment, if the traffic steering indication information includes a traffic steering target and a suggested traffic steering ratio, corresponding to the former scenario of Embodiment 3, the RAN node may update the RAN assistant information and the traffic steering ratio based on knowledge of itself, and feed back the updated traffic steering information to the UE, the updated traffic steering information containing at least the traffic steering ratio. Hence, the UE may steer corresponding traffic to the traffic steering target according to the traffic steering ratio.

In this embodiment, if the traffic steering indication information includes only a suggested traffic steering ratio, corresponding to the latter scenario of Embodiment 3 where the UE does not support an ANDSF, the RAN node may further determine a traffic steering target in addition to determining the traffic steering ratio, and then feed back the updated traffic steering information to the UE, the updated traffic steering information containing at least the traffic steering target and the traffic steering ratio. Hence, the UE may steer corresponding traffic to the traffic steering target according to the traffic steering ratio.

In this embodiment, in determining the traffic steering ratio and the traffic steering target, the RAN node may determine the traffic steering ratio and the traffic steering target based on knowledge of itself, such as a load of the RAN node, a load of a neighboring node, information collected from the UE, a measurement report, a traffic steering ratio suggested by the UE, and information collected from a AP when the AP is co-located with the base station, etc. Likewise, the traffic steering ratio may be directed to steering from the 3GPP RAN to the WLAN AP, or may be directed to steering from the WLAN AP to the 3GPP RAN. The traffic steering target may be the WLAN or the 3GPP RAN.

In this embodiment, the information collected from the UE may include traffic being performed by the UE, and the UE capability. The UE capability may include whether supporting network selection and UE determined traffic steering assisted by the RAN, and whether supporting an enhanced ANDSF, etc. In this embodiment, in a case where the AP is co-located with the RAN node, the RAN node may collect information related to the WLAN from the AP via an internal interface. The information collected from the AP may include, for example, a load of WLAN, etc. In this embodiment, if the RAN node configures the UE with measurement, the RAN node may further collect information related to the WLAN from a measurement report transmitted by the UE via measurement of the UE, so as to decide the traffic steering target.

In this embodiment, if the UE does not support the ANDSF, the RAN node may further determine offloadable APNs and/or bearer IDs, and feed back the updated traffic steering information to the UE, the updated traffic steering information containing the offloadable APNs and/or bearer IDs, in addition to the traffic steering target and the traffic steering ratio. Hence, the UE may steer corresponding traffic to the traffic steering target according to the traffic steering ratio and the offloadable APNs and/or bearer IDs. In this embodiment, similar to Embodiment 1, the RAN node may acquire APNs and/or bearer information from a core network, determine which APNs and/or which bearers may be offloaded, and transmit IDs of the offloadable APNs and/or bearer, together with the determined traffic steering target and traffic steering ratio, to the UE, via the above updated traffic steering information.

In this embodiment, if the traffic steering indication information includes a suggested traffic steering ratio for measurement objects, corresponding to the latter scenario of Embodiment 3 where the UE supports an ANDSF, the suggested traffic steering ratio for measurement objects may be fed back to the RAN node along with the measurement report, or may be fed back to the RAN node via a separate list. And the RAN node may determine a final traffic steering target and traffic steering ratio according to the received information, and transmit them to the UE via the above updated traffic steering information.

With the method of this embodiment, the UE indicates a suggested traffic steering ratio to the RAN node, load balance between 3GPP RAN and WLAN at RAN level may be ensured, and in comparison with an existing mechanism, user experiences and system performance are improved.

Embodiment 5

This embodiment provides an apparatus for controlling traffic steering, which is applicable to an RAN node, such as a NodeB (a base station in 3G), an eNodeB (a base station in LTE), and an RAC (radio network controller), etc. As principles of the apparatus for solving problems are similar to that of the method of Embodiment 1, the implementation of the method of Embodiment 1 may be referred to for implementation of the apparatus, with identical contents being not going to be described herein any further.

Figure 7:
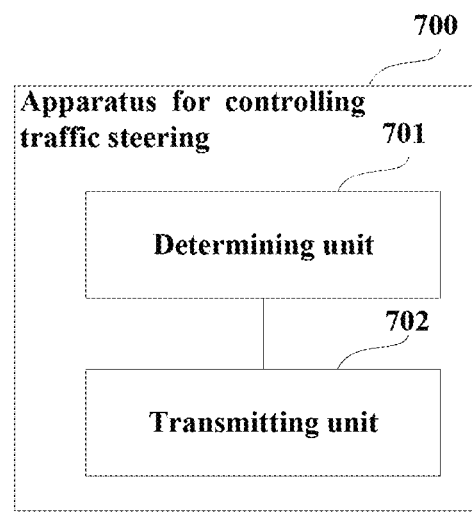
FIG. 7 is a schematic diagram of an apparatus for controlling traffic steering of Embodiment 5.

FIG. 7 is a schematic diagram of a structure of the apparatus. Referring to FIG. 7, the apparatus 700 for controlling traffic steering includes a determining unit 701 and a transmitting unit 702.

The determining unit 701 is configured to determine traffic steering indication information.

And the transmitting unit 702 is configured to transmit the traffic steering indication information to UE, so that the UE steers corresponding traffic to a traffic steering target according to the traffic steering indication information.

In this embodiment, the traffic steering indication information may be a traffic steering ratio, or a traffic steering ratio and a shift range, or a traffic steering target and a traffic steering ratio, or a traffic steering target, a traffic steering ratio and a shift range, or a traffic steering target, traffic steering and offloadable APNs and/or bearer IDs.

In this embodiment, if the UE supports an ANDSF and the RAN node is able to obtain ANDSF information related to the UE, the traffic steering indication information may be a traffic steering ratio, or a traffic steering target and a traffic steering ratio.

In this embodiment, if the UE supports an ANDSF, but the RAN node is unable to obtain ANDSF information related to the UE, the traffic steering indication information may be a traffic steering ratio and a shift range, or a traffic steering target, a traffic steering ratio and a shift range.

In this embodiment, if the UE does not support an ANDSF, the traffic steering indication information may be a traffic steering target, traffic steering and offloadable APNs and/or bearer IDs.

With the apparatus of this embodiment, the RAN node indicates a suggested traffic steering ratio to the UE, load balance between 3GPP RAN and WLAN at an RAN level may be ensured, and in comparison with an existing mechanism, user experiences and system performance are improved.

Embodiment 6

This embodiment provides an apparatus for controlling traffic steering, applicable to UE. As principles of the apparatus for solving problems are similar to that of the method of Embodiment 2, the implementation of the method of Embodiment 2 may be referred to for implementation of the apparatus, with identical contents being not going to be described herein any further.

Figure 8:
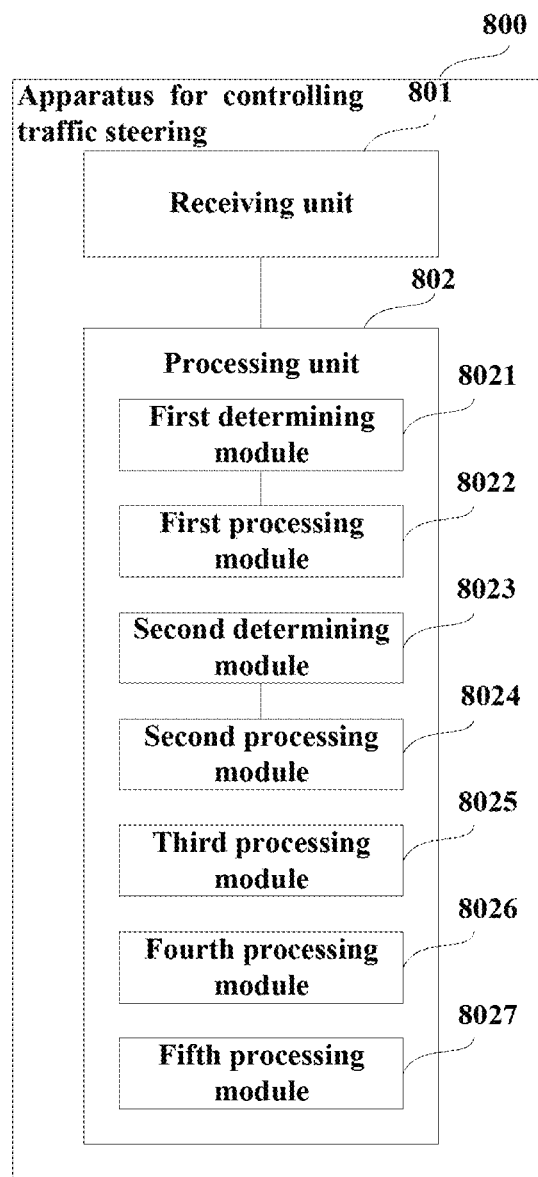
FIG. 8 is a schematic diagram of an apparatus for controlling traffic steering of Embodiment 6.

FIG. 8 is a schematic diagram of a structure of the apparatus. Referring to FIG. 8, the apparatus 800 for controlling traffic steering includes a receiving unit 801 and a processing unit 802.

The receiving unit 801 is configured to receive traffic steering indication information transmitted by an RAN node.

And the processing unit 802 is configured to steer corresponding traffic to a traffic steering target according to the traffic steering indication information.

In an implementation, the processing unit 802 includes:
a first determining module 8021 configured to determine a traffic steering target when the traffic steering indication information is a traffic steering ratio; and
a first processing module 8022 configured to steer corresponding traffic to the traffic steering target according to the traffic steering ratio.

In another implementation, the processing unit 802 includes:
a second determining module 8023 configured to determine a traffic steering target when the traffic steering indication information is a traffic steering ratio and a shift range; and
a second processing module 8024 configured to steer corresponding traffic to the traffic steering target according to the traffic steering ratio and the shift range.

In a further implementation, the processing unit 802 includes:
a third processing module 8025 configured to, when the traffic steering indication information is a traffic steering target and a traffic steering ratio, steer corresponding traffic to the traffic steering target according to the traffic steering ratio.

In still another implementation, the processing unit 802 includes:
a fourth processing module 8026 configured to, when the traffic steering indication information is a traffic steering target, a traffic steering ratio and a shift range, steer corresponding traffic to the traffic steering target according to the traffic steering ratio and the shift range.

In yet another implementation, the processing unit 802 includes:
a fifth processing module 8027 configured to, when the traffic steering indication information is a traffic steering target, a traffic steering ratio and offloadable APNs and/or bearer IDs, steer corresponding traffic to the traffic steering target according to the traffic steering ratio and offloadable APNs and/or bearer IDs.

With the apparatus of this embodiment, the RAN node indicates a suggested traffic steering ratio to the UE, load balance between 3GPP RAN and WLAN at an RAN level may be ensured, and in comparison with an existing mechanism, user experiences and system performance are improved.

Embodiment 7

This embodiment provides a method for controlling traffic steering, applicable to UE. As principles of the apparatus for solving problems are similar to that of the method of Embodiment 3, the implementation of the method of Embodiment 3 may be referred to for implementation of the apparatus, with identical contents being not going to be described herein any further.

Figure 9:
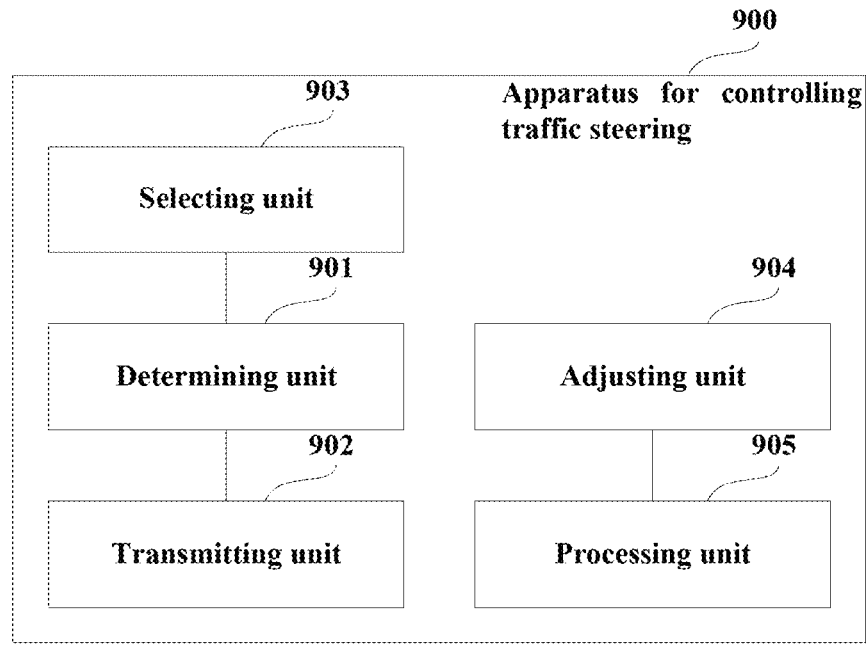
FIG. 9 is a schematic diagram of an apparatus for controlling traffic steering of Embodiment 7.

FIG. 9 is a schematic diagram of a structure of the apparatus. Referring to FIG. 9, the apparatus 900 for controlling traffic steering includes a determining unit 901 and a transmitting unit 902.

The determining unit 901 is configured to determine traffic steering indication information.

And the transmitting unit 902 is configured to transmit the traffic steering indication information to an RAN node, so that the RAN node decides a traffic steering ratio.

In this embodiment, the traffic steering indication information is a traffic steering target and a suggested traffic steering ratio, or a suggested traffic steering ratio, or a suggested traffic steering ratio for measurement objects. In this embodiment, when network selection and traffic steering are determined by a terminal, the traffic steering indication information contains a traffic steering target and a suggested traffic steering ratio; and when network selection and traffic steering are determined by the RAN node, the traffic steering indication information contains a suggested traffic steering ratio (when the UE does not support an ANDSF), or contains a suggested traffic steering ratio for measurement objects (when the UE supports an ANDSF), the suggested traffic steering ratio may be indicated via a measurement report, or via a separate list.

In an implementation, the apparatus 900 may further include:
a selecting unit 903 configured to perform a network selection process before the determining unit 901 determines the traffic steering indication information, so as to determine a network to be accessed.

In an implementation, the apparatus 900 may further include:
an adjusting unit 904 configured to, when the UE receives updated traffic steering information fed back by the RAN node, adjust a traffic steering ratio according to the updated traffic steering information; and
a processing unit 905 configured to steer corresponding traffic to the traffic steering target according to the traffic steering ratio.

In this embodiment, the updated traffic steering information contains a traffic steering ratio, or contains a traffic steering target and a traffic steering ratio, or contains a traffic steering target, a traffic steering ratio and offloadable APNs and/or bearer IDs.

With the apparatus of this embodiment, the UE indicates a suggested traffic steering ratio to the RAN node, load balance between 3GPP RAN and WLAN at an RAN level may be ensured, and in comparison with an existing mechanism, user experiences and system performance are improved.

Embodiment 8

This embodiment provides an apparatus for controlling traffic steering, which is applicable to an RAN node, such as a NodeB (a base station in 3G), an eNodeB (a base station in LTE), and an RAC (radio network controller), etc. As principles of the apparatus for solving problems are similar to that of the method of Embodiment 4, the implementation of the method of Embodiment 4 may be referred to for implementation of the apparatus, with identical contents being not going to be described herein any further.

Figure 10:
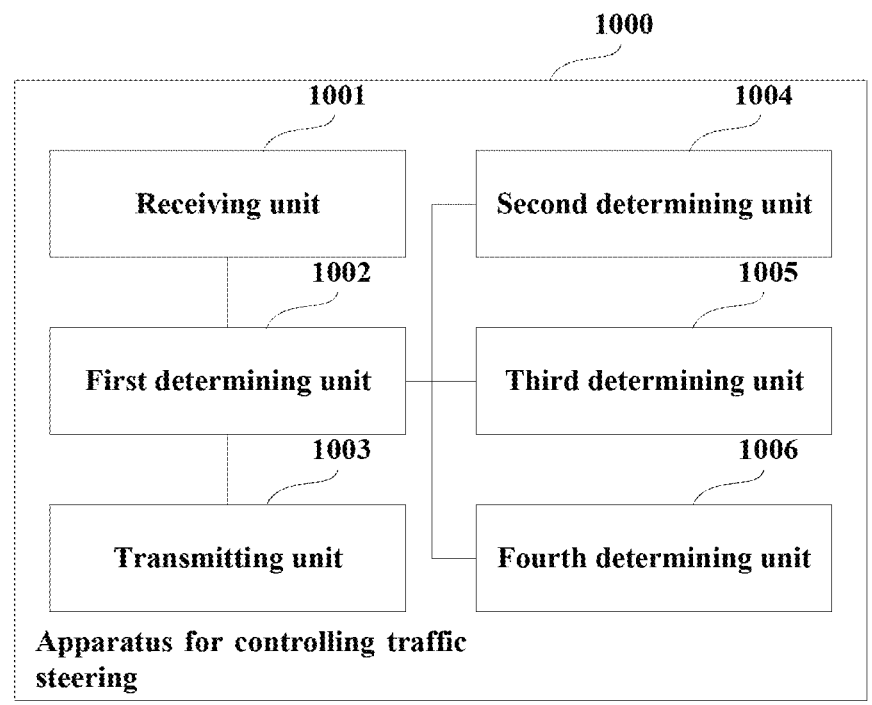
FIG. 10 is a schematic diagram of an apparatus for controlling traffic steering of Embodiment 8.

FIG. 10 is a schematic diagram of a structure of the apparatus. Referring to FIG. 10, the apparatus 1000 for controlling traffic steering includes a receiving unit 1001, a first determining unit 1002 and a transmitting unit 1003.

The receiving unit 1001 is configured to receive traffic steering indication information transmitted by UE.

The first determining unit 1002 is configured to determine a traffic steering ratio according to the traffic steering indication information.

And the transmitting unit 1003 is configured to transmit the traffic steering ratio to the UE, so that the UE steers corresponding traffic to a traffic steering target according to the traffic steering ratio.

In this embodiment, the traffic steering indication information includes a traffic steering target and a suggested traffic steering ratio, or a suggested traffic steering ratio, or a suggested traffic steering ratio for measurement objects. In this embodiment, when network selection and traffic steering are determined by a terminal, the traffic steering indication information contains a traffic steering target and a suggested traffic steering ratio; and when network selection and traffic steering are determined by the RAN node, the traffic steering indication information contains a suggested traffic steering ratio (when the UE does not support an ANDSF), or contains a suggested traffic steering ratio for measurement objects (when the UE supports an ANDSF), the suggested traffic steering ratio may be indicated via a measurement report, or via a separate list.

In an implementation, the apparatus 1000 may further include:

a second determining unit 1004 configured to, when the traffic steering indication information comprises only a suggested traffic steering ratio (when network selection and traffic steering are determined by a base station, and the UE does not support an ANDSF), determine a traffic steering target and offloadable APNs and/or bearer IDs. In this embodiment, the transmitting unit 1003 transmits the traffic steering target, the traffic steering ratio and the offloadable APNs and/or bearer IDs to the UE, so that the UE steers corresponding traffic to the traffic steering target according to the traffic steering target, the traffic steering ratio and the offloadable APNs and/or bearer IDs.

In an implementation, the apparatus 1000 may further include:

a third determining unit 1005 configured to, when the traffic steering indication information comprises a traffic steering target and a suggested traffic steering ratio (when network selection and traffic steering are determined by the UE), update RAN assistant information and the traffic steering ratio according to knowledge of the RAN node. In this embodiment, the transmitting unit 1003 transmits the traffic steering ratio to the UE, so that the UE steers corresponding traffic to the traffic steering target according to the traffic steering ratio.

In an implementation, the apparatus 1000 may further include:

a fourth determining unit 1006 configured to, when the traffic steering indication information comprises the suggested traffic steering ratio for measurement objects (when network selection and traffic steering are determined by a base station, and the UE supports an ANDSF), select and determine a traffic steering target and a corresponding traffic steering ratio from the suggested traffic steering ratio for measurement objects according to knowledge of the RAN node. In this embodiment, the transmitting unit 1003 transmits the traffic steering target and the corresponding traffic steering ratio to the UE, so that the UE steers corresponding traffic to the traffic steering target according to the traffic steering ratio.

With the apparatus of this embodiment, the UE indicates a suggested traffic steering ratio to the RAN node, load balance between 3GPP RAN and WLAN at RAN level may be ensured, and in comparison with an existing mechanism, user experiences and system performance are improved.

Embodiment 9

This embodiment provides UE, including the apparatus for controlling traffic steering as described in Embodiment 6 or 7.

Figure 11:
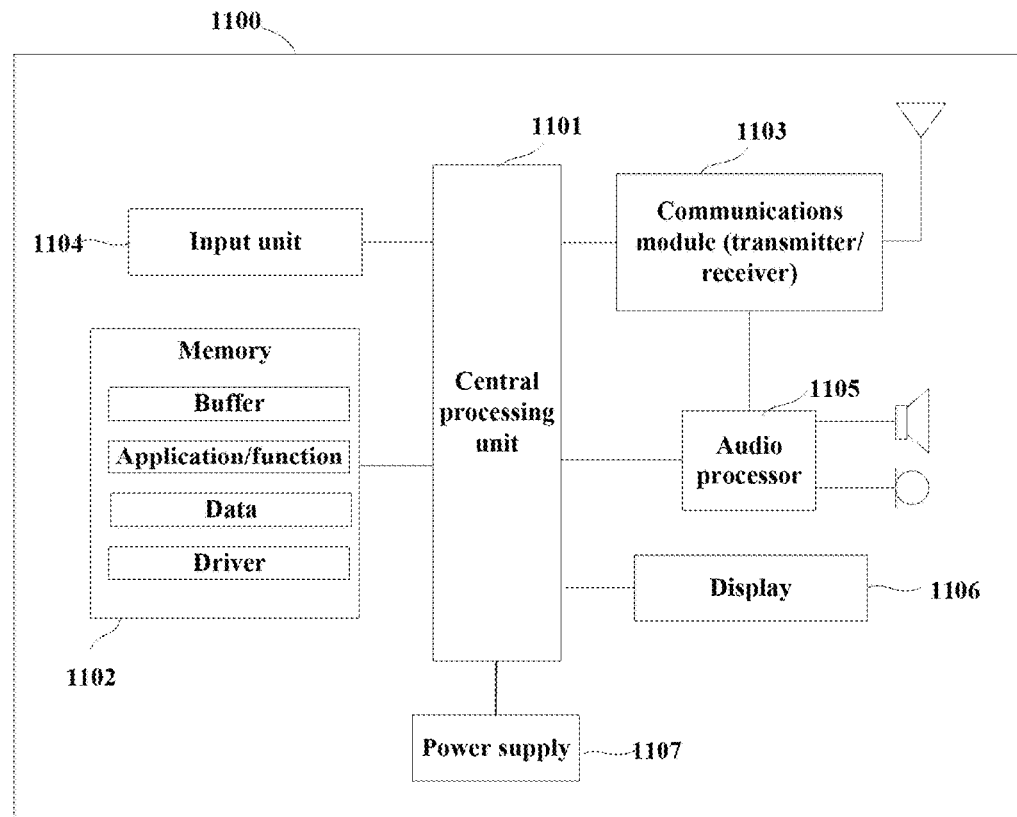
FIG. 11 is a schematic diagram of a structure of UE of Embodiment 9.

FIG. 11 is a block diagram of a structure of the UE of the embodiment of this disclosure. As shown in FIG. 11, the UE 1100 may include a central processing unit 1101 and a memory 1102, the memory 1102 being coupled to the central processing unit 1101. It should be noted that this figure is illustrative only, and other types of structures may also be used, so as to supplement or replace this structure and achieve a telecommunications function or other functions.

In an implementation, the functions of the apparatus for controlling traffic steering may be integrated into the central processing unit 1101, and the central processing unit 1101 carries out the functions of the apparatus for controlling traffic steering as described in Embodiment 6 or 7; wherein, the functions of the apparatus for controlling traffic steering are incorporated herein, which will not be described herein any further.

In another implementation, the apparatus for controlling traffic steering and the central processing unit 1101 may be configured separately. For example, the apparatus for controlling traffic steering may be configured as a chip connected to the central processing unit 1101, with its functions being realized under control of the central processing unit 1101.

As shown in FIG. 11, the UE 1100 may further include a communications module 1103, an input unit 1104, an audio processing unit 1105, a display 1106 and a power supply 1107. It should be noted that the UE 1100 does not necessarily include all the parts shown in FIG. 11, and furthermore, the UE 1100 may include parts not shown in FIG. 11, and the prior art may be referred to.

As shown in FIG. 11, the central processing unit 1101 is sometimes referred to as a controller or control, and may include a microprocessor or other processor devices and/or logic devices. The central processing unit 1101 receives input and controls operations of every component of the UE 1100.

In this embodiment, the memory 1102 may be, for example, one or more of a buffer memory, a flash memory, a hard drive, a mobile medium, a volatile memory, a nonvolatile memory, or other suitable devices, which may store the above information related to configuration, and may further store a program executing related information. And the central processing unit 1101 may execute the program stored in the memory 1102, so as to realize information storage or processing, etc. Functions of other parts are similar to those of the prior art, which will not be described herein any further. The parts of the UE 1100 may be realized by specific hardware, firmware, software, or any combination thereof, without departing from the scope of the present disclosure.

With the apparatus of this embodiment, the RAN node indicates a suggested traffic steering ratio to the UE, load balance between 3GPP RAN and WLAN at RAN level may be ensured, and in comparison with an existing mechanism, user experiences and system performance are improved.

Embodiment 10

This embodiment provides an RAN node, such as a NodeB (a base station in 3G), an eNodeB (a base station in LTE), and an RAC (radio network controller), etc. In this embodiment, the RAN node includes the apparatus for controlling traffic steering as described in Embodiment 5 or 8.

Figure 12:
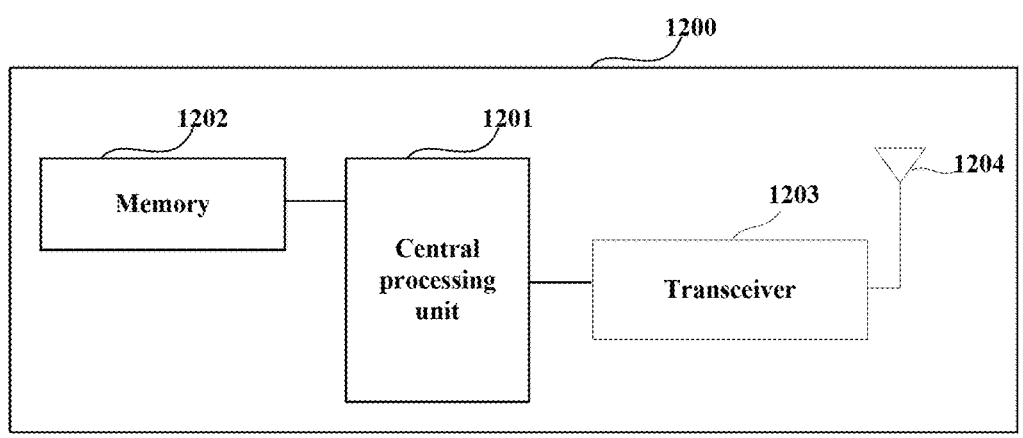
FIG. 12 is a schematic diagram of a structure of an RAN node of Embodiment 10.

FIG. 12 is a schematic diagram of a structure of an implementation of the RAN node of the embodiment of this disclosure. As shown in FIG. 12, the RAN node 1200 may include a central processing unit (CPU) 1201 and a memory 1202, the memory 1202 being coupled to the central processing unit 1201. In this embodiment, the memory 1202 may store various data, and furthermore, it may store a program for information processing, and execute the program under control of the central processing unit 1201, so as to received various information transmitted by UE, and transmit various information to the UE.

In an implementation, the functions of the apparatus for controlling traffic steering may be integrated into the central processing unit 1201, and the central processing unit 1201 carries out the functions of the apparatus for controlling traffic steering as described in Embodiment 5 or 8; wherein, the functions of the apparatus for controlling traffic steering are incorporated herein, which will not be described herein any further.

In another implementation, the apparatus for controlling traffic steering and the central processing unit 1201 may be configured separately. For example, the apparatus for controlling traffic steering may be configured as a chip connected to the central processing unit 1201, with its functions being realized under control of the central processing unit 1201.

Furthermore, as shown in FIG. 12, the RAN node 1200 may include a transceiver 1203, and an antenna 1204, etc. In this embodiment, functions of the above components are similar to those in the prior art, and will not be described herein any further. It should be noted that the RAN node 1200 does not necessarily include all the parts shown in FIG. 12, and furthermore, the RAN node 1200 may include parts not shown in FIG. 12, and the prior art may be referred to.

With the apparatus of this embodiment, the UE indicates a suggested traffic steering ratio to the RAN node, load balance between 3GPP RAN and WLAN at an RAN level may be ensured, and in comparison with an existing mechanism, user experiences and system performance are improved.

Embodiment 11

Figure 13:
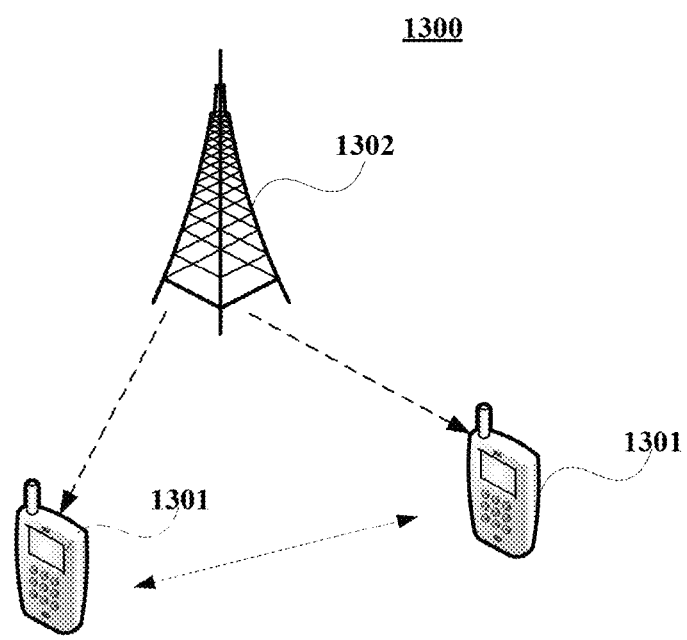
FIG. 13 is a schematic diagram of a topology of a communications system of Embodiment 11.

This embodiment provides a communications system. FIG. 13 is a schematic diagram of a topology of the communications system. As shown in FIG. 13, the communications system 1300 includes UE 1301 and an RAN node 1302. The RAN node 1302 may be a NodeB (a base station in 3G), an eNodeB (a base station in LTE), and an RAC (radio network controller), etc.

In this embodiment, the UE 1301 may be carried out by the UE in Embodiment 9, the contents of which being incorporated herein, and being not going to be described herein any further.

In this embodiment, the RAN node 1302 may be carried out by the RAN node in Embodiment 10, the contents of which being incorporated herein, and being not going to be described herein any further.

With the communications system of this embodiment, load balance between 3GPP RAN and WLAN at an RAN level may be ensured, and in comparison with an existing mechanism, user experiences and system performance are improved.

An embodiment of the present disclosure provides a computer readable program code, which, when executed in an apparatus for controlling traffic steering or UE, will cause a computer unit to carry out the method for controlling traffic steering described in Embodiment 2 or 3 in the apparatus for controlling traffic steering or the UE.

An embodiment of the present disclosure provides a computer readable medium, including a computer readable program code, which will cause a computer unit to carry out the method for controlling traffic steering described in Embodiment 2 or 3 in an apparatus for controlling traffic steering or UE.

An embodiment of the present disclosure provides a computer readable program code, which, when executed in an apparatus for controlling traffic steering or an RAN node, will cause a computer unit to carry out the method for controlling traffic steering described in Embodiment 1 or 4 in the apparatus for controlling traffic steering or the RAN node.

An embodiment of the present disclosure provides a computer readable medium, including a computer readable program code, which will cause a computer unit to carry out the method for controlling traffic steering described in Embodiment 1 or 4 in an apparatus for controlling traffic steering or an RAN node.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. An apparatus for controlling traffic steering, applicable to a Radio Access Network (RAN) node, the apparatus comprising:
   a memory that stores a plurality of instructions;
   a processor that couples to the memory and configured to execute the instructions to:
   determine traffic steering indication information; and
   transmit the traffic steering indication information to a User Equipment (UE), so that the UE steers corresponding traffic to a traffic steering target according to the traffic steering indication information, wherein the traffic steering indication information is a traffic steering ratio and a shift range, or a traffic steering target, a traffic steering ratio and a shift range.

2. The apparatus according to claim 1, wherein if the UE supports an Access Network Discovery and Selection Function (ANDSF), and the RAN node cannot obtain ANDSF information related to the UE, the traffic steering indication information is a traffic steering ratio and a shift range, or a traffic steering target, a traffic steering ratio and a shift range.

3. The apparatus according to claim 1, wherein if the UE does not support an ANDSF, the traffic steering indication information is a traffic steering target, traffic steering and offloadable APNs and/or bearer IDs.

4. The apparatus according to claim 1, wherein the processor is further configured to execute the instructions to:
  receive traffic steering indication information transmitted by UE; and
  determine the traffic steering ratio according to the received traffic steering indication information.

5. An apparatus for controlling traffic steering, applicable to an Radio Access Network (RAN) node, the apparatus comprising:
  a memory that stores a plurality of instructions;
  a processor that couples to the memory and configured to execute the instructions to:
  determine a traffic steering ratio;
  transmit the traffic steering ratio and shift range to a User Equipment (UE), so that the UE steers corresponding traffic to a traffic steering target according to the traffic steering ratio and shift range:
  receive traffic steering indication information transmitted by UE; and
  determine the traffic steering ratio according to the received traffic steering indication information, wherein the received traffic steering indication information comprises a traffic steering target and a suggested traffic steering ratio, or a suggested traffic steering ratio, or a suggested traffic steering ratio for measurement objects.

6. The apparatus according to claim 5, wherein the processor is further configured to execute the instructions to:
  determine a traffic steering target and offloadable Access Point Names (APNs) and/or bearer IDs when the received traffic steering indication information comprises only a suggested traffic steering ratio; and
  transmit the traffic steering target, the traffic steering ratio and the offloadable APNs and/or bearer IDs to the UE, so that the UE steers corresponding traffic to the traffic steering target according to the traffic steering ratio and the offloadable APNs and/or bearer IDs.

7. The apparatus according to claim 6, wherein the processor is further configured to:
  update RAN assistant information and the traffic steering ratio according to knowledge of the RAN node when the received traffic steering indication information comprises a traffic steering target and a suggested traffic steering ratio; and
  transmit the updated traffic steering ratio to the UE, so that the UE steers corresponding traffic to the traffic steering target according to the traffic steering ratio.

8. The apparatus according to claim 6, wherein the processor is further configured to:
  select and determine a traffic steering ratio and a traffic steering target from a suggested traffic steering ratio for measurement objects according to knowledge of the RAN node when the received traffic steering indication information comprises the suggested traffic steering ratio for measurement objects; and
  transmit the traffic steering ratio and the traffic steering target to the UE, so that the UE steers corresponding traffic to the traffic steering target according to the traffic steering ratio.

9. An apparatus for controlling traffic steering, applicable to a User Equipment (UE), the apparatus comprising:
  a memory that stores a plurality of instructions;
  a processor that couples to the memory and configured to execute the instructions to:
  receive traffic steering indication information transmitted by a Radio Access Network (RAN) node; and
  steer corresponding traffic to a traffic steering target according to the traffic steering indication information, wherein the steering corresponding traffic to a traffic steering target according to the traffic steering indication information comprises:
  determining a traffic steering target when the traffic steering indication information is a traffic steering ratio and a shift range; and
  steer corresponding traffic to the traffic steering target according to the traffic steering ratio and the shift range;
  or the steering corresponding traffic to a traffic steering target according to the traffic steering indication information comprises:
  when the traffic steering indication information is a traffic steering target and a traffic steering ratio, steer corresponding traffic to the traffic steering target according to the traffic steering ratio;
  or the steering corresponding traffic to a traffic steering target according to the traffic steering indication information comprises:
  when the traffic steering indication information is a traffic steering target, a traffic steering ratio and a shift range, steer corresponding traffic to the traffic steering target according to the traffic steering ratio and the shift range.

10. An apparatus for controlling traffic steering, applicable to UE, the apparatus comprising:
  a memory that stores a plurality of instructions;
  a processor that couples to the memory and configured to execute the instructions to:
  receive updated traffic steering information transmitted by a Radio Access Network (RAN) node wherein the updated traffic steering information is a traffic steering ratio and a shift range;
  steer corresponding traffic to a traffic steering target according to the updated traffic steering information;
  determine traffic steering indication information; and
  transmit the traffic steering indication information to an RAN node, so that the RAN node decides a traffic steering ratio and transmits the updated traffic steering information to the UE, wherein the transmitted traffic steering indication information is a traffic steering target and a suggested traffic steering ratio, or a suggested traffic steering ratio, or a suggested traffic steering ratio for measurement objects.

11. The apparatus according to claim 10, wherein the processor is further configured to execute the instructions to:
  adjust a traffic steering ratio according to the updated traffic steering information when the UE receives the updated traffic steering information fed back by the RAN node; and
  steer corresponding traffic to the traffic steering target according to the traffic steering ratio.

12. The apparatus according to claim 11, wherein the updated traffic steering information comprises a traffic steering ratio, or a traffic steering target and a traffic steering ratio, or a traffic steering target, a traffic steering ratio and offloadable Access Point Names (APNs) and/or bearer IDs.

* * * * *